(12) United States Patent
Jun et al.

(10) Patent No.: US 9,753,291 B2
(45) Date of Patent: Sep. 5, 2017

(54) ANTISTATIC FILM, METHOD FOR MANUFACTURING THE SAME, AND DISPLAY DEVICE INCLUDING THE SAME

(71) Applicant: LG Display Co., Ltd., Seoul (KR)

(72) Inventors: Taehwan Jun, Ilsan-gu (KR); Sunghee Kim, Paju-si (KR); Junsik Hwang, Seoul (KR); Kwihong Park, Paju-si (KR); Yuseon Kho, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 201 days.

(21) Appl. No.: 14/098,854

(22) Filed: Dec. 6, 2013

(65) Prior Publication Data

US 2014/0320959 A1 Oct. 30, 2014

(30) Foreign Application Priority Data

Apr. 29, 2013 (KR) .......................... 10-2013-0047571

(51) Int. Cl.
*G02B 27/22* (2006.01)
*G02B 1/16* (2015.01)

(52) U.S. Cl.
CPC ............... *G02B 27/22* (2013.01); *G02B 1/16* (2015.01); *Y10T 428/2495* (2015.01); *Y10T 428/31663* (2015.04)

(58) Field of Classification Search
CPC ......... G02B 1/115; G02B 1/111; G02B 1/116; G02B 5/285; G02B 27/22; G02B 1/16; H04N 13/0409; H04N 13/0497; B32B 27/32; B32B 27/36; B32B 5/18; C08L 83/04; C08L 23/06; C08L 69/00; Y10T 428/31663; Y10T 428/2495
USPC ......... 359/464, 580–582, 585, 589; 428/213, 428/212, 313.9, 447; 427/58, 299, 300, 427/335, 402, 411.1; 524/183, 261, 266, 524/268
See application file for complete search history.

(56) References Cited

U.S. PATENT DOCUMENTS 6,201,051 B1 * 3/2001 Mager .................... C08G 61/12
524/183
6,362,414 B1 * 3/2002 Fujisawa ............... C03C 17/007
136/244
7,794,780 B2 * 9/2010 Kausch .................... B32B 7/02
427/299

FOREIGN PATENT DOCUMENTS

CN 102722045 A 10/2012

OTHER PUBLICATIONS

Office Action dated Aug. 5, 2016 for Chinese Application No. 201310705371.5, 23 pages.

* cited by examiner

*Primary Examiner* — Jie Lei
(74) *Attorney, Agent, or Firm* — Brinks Gilson & Lione

(57) ABSTRACT

An antistatic film includes a substrate, a lower coating layer positioned on the substrate and including a conductive material, tetraethyl orthosilicate (TEOS), and silsesquioxane (SSQ), and an upper coating layer positioned on the lower coating layer and including the conductive material and tetraethyl orthosilicate.

12 Claims, 5 Drawing Sheets

(a)

(b)

reflection mode  reflection mode

ANTISTATIC FILM, METHOD FOR MANUFACTURING THE SAME, AND DISPLAY DEVICE INCLUDING THE SAME

This application claims the benefit of priority to Korean Patent Application No. 10-2013-0047571 filed on Apr. 29, 2013, which is incorporated herein by reference for all purposes as if fully set forth herein.

BACKGROUND

Field of the Disclosure

Embodiments of the disclosure relates to a display device. More particularly, the disclosure relates to an antistatic film for preventing static electricity, a method for manufacturing the same, and a display device including the same.

Related Art

In accordance with development of information communication and contents technologies, a consumer does not satisfy high-quality two-dimensional visualizing type contents but requires 3D-contents through which more realistic experience is capable of being obtained. In 2010s, a 3D-display technique already becomes a major concern target in a consumer electronic market. Further, a general consumer may easily experience a wearable display device and immersive type and large-scaled three-dimensional display devise, which are used a typical visualizing interface in a virtual reality study, through a 3D movie theater and an exhibit hall.

A stereoscopic (3D) display device embodies a stereoscopic image by using a stereoscopic technique or an autostereoscopic technique. Among the techniques, the stereoscopic technique uses a time difference image of left and right eyes, which has a large 3D effect. As the stereoscopic technique, there are an eyeglass technique and a non-eyeglass technique, and two techniques are both put to practical use. The eyeglass technique displays images by changing a polarization direction of left and right time difference images or the images in a time sharing mode in a direct-view-type display element or projector. In the eyeglass technique, polarizing eyeglasses or liquid crystal shutter eyeglasses are used to embody a 3D image. In the non-eyeglass technique, in general, an optical plate such as a parallax barrier for separating optical axes of left and right time difference images is provided on the front or the rear of a display screen.

FIG. 1 is a view showing a known stereoscopic display device which embodies a stereoscopic image by using polarizing eyeglasses.

Referring to FIG. 1, an eyeglass type stereoscopic display device 1 includes a thin film transistor array substrate 10, a color filter substrate 12 including a color filter 13 and a black matrix 14, and a liquid crystal layer 15 interposed between the thin film transistor array substrate 10 and the color filter substrate 12. In addition, lower polarizers 16b are positioned on the thin film transistor array substrate 10. A black stripe 20 and a back ITO 21 preventing static electricity are positioned on the color filter substrate 12. An upper polarizer 16a, a patterned retarder 17, and a passivation film 18 subjected to surface treatment are positioned on the back ITO 21 to constitute the stereoscopic display device 1.

The eyeglass type stereoscopic display device 1 having the aforementioned constitution alternately displays a left eye image and a right eye image, and switches a property of polarized light that is incident through the patterned retarder 17 on the polarizing eyeglasses. Accordingly, the eyeglass type may spatially divide the left eye image and the right eye image to embody a 3D image.

However, the rear ITO 21 positioned on the black stripe 20 is deposited in a small thickness and thus has a defect of an occurrence of cracks. Further, when a step of the black stripe 20 is covered by an overcoat (OC) layer and the rear ITO 21 is then formed, there are problems in that a cost is increased due to addition of processes and use of rare metal and scratches are formed during a washing process due to low hardness to reduce an image quality.

SUMMARY

An antistatic film includes a substrate, a lower coating layer positioned on the substrate and including a conductive material, tetraethyl orthosilicate (TEOS), and silsesquioxane (SSQ), and an upper coating layer positioned on the lower coating layer and including the conductive material and tetraethyl orthosilicate.

A method for manufacturing an antistatic film includes preparing a substrate, applying a lower coating layer composition including 20 to 25 parts by weight of a conductive material, 7 to 11 parts by weight of tetraethyl orthosilicate, 20 to 30 parts by weight of silsesquioxane, 25 to 40 parts by weight of a solvent, and 8 to 16 parts by weight of an additive on the substrate, and heat-treating the lower coating layer composition to form a lower coating layer, and applying an upper coating layer composition including 0.1 to 10 parts by weight of the conductive material, 5 to 30 parts by weight of tetraethyl orthosilicate, 30 to 60 parts by weight of the solvent, and to 16 parts by weight of the additive on the lower coating layer, and heat-treating the upper coating layer composition to form an upper coating layer.

A stereoscopic display device comprises a thin film transistor array substrate, a color filter substrate facing the thin film transistor array substrate and including a black matrix, a black stripe formed on the color filter substrate and formed to correspond to the black matrix, and an antistatic film formed on the black stripe, wherein the antistatic film includes a lower coating layer including a conductive material, tetraethyl orthosilicate (TEOS), and silsesquioxane (SSQ), and an upper coating layer positioned on the lower coating layer and including the conductive material and tetraethyl orthosilicate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
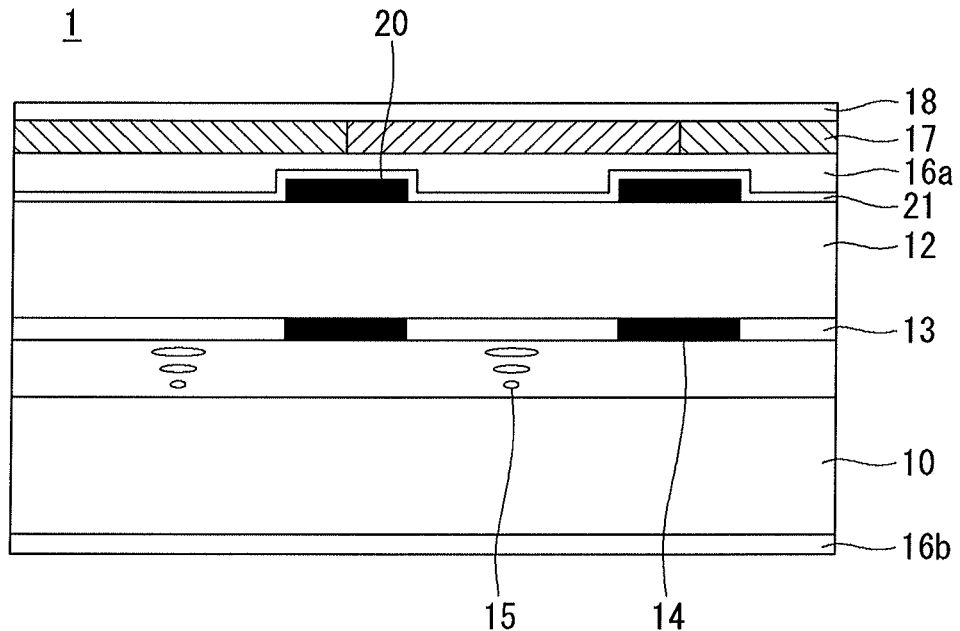
FIG. 1 is a view showing a known stereoscopic display device.
Figure 2:
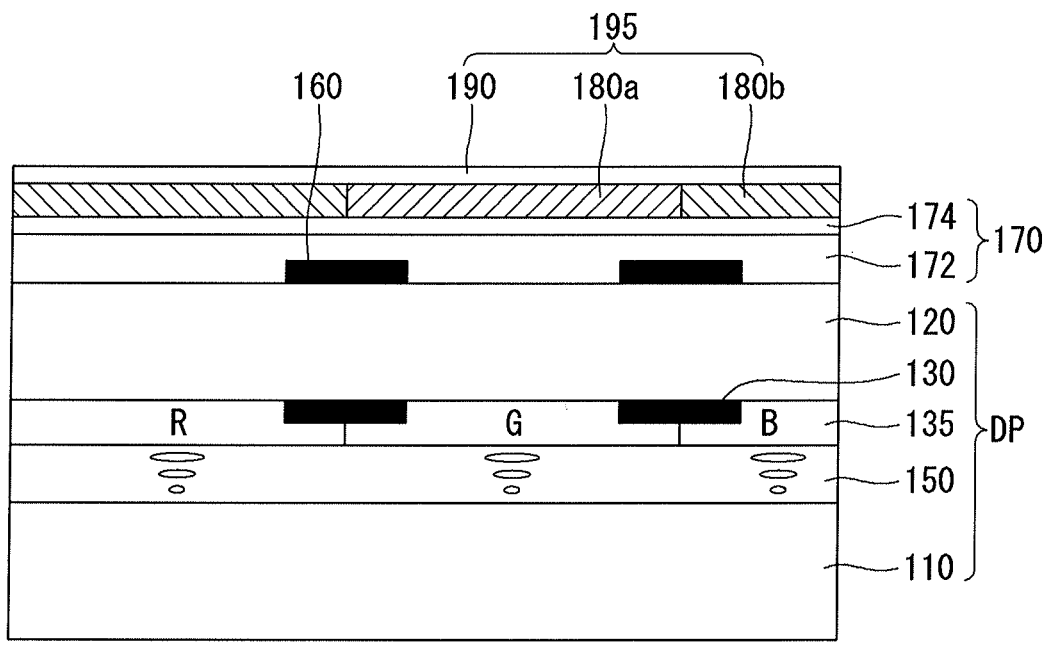
FIG. 2 is a view showing a stereoscopic display device according to an exemplary embodiment of the disclosure.

FIG. 2 is a view showing a stereoscopic display device according to an exemplary embodiment of the disclosure.

Referring to FIG. 2, a stereoscopic display device according to an exemplary embodiment of the disclosure is constituted by a display panel DP including a thin film transistor array substrate 110, a color filter substrate 120 facing the thin film transistor array substrate 110, and a liquid crystal layer 150 interposed therebetween.

In more detail, a thin film transistor array is formed on the thin film transistor array substrate 110. The thin film transistor array includes a plurality of data lines to which R, G, and B data voltages are supplied, a plurality of gate lines (or scan lines) crossing the data lines, to which a gate pulse (or a scan pulse) is supplied, a plurality of thin film transistors formed at crossing portions of the data lines and the gate lines, a plurality of pixel electrodes charging the data voltage to liquid crystal cells, and a storage capacitor connected to the pixel electrode to maintain the voltage of the liquid crystal cell.

A common electrode facing the pixel electrode to form an electric field is formed on the color filter substrate 120 in a vertical or horizontal field driving mode such as a TN (twisted nematic) mode and a VA (vertical alignment) mode. The common electrode is formed together with the pixel electrode on the thin film transistor array substrate 110 in the horizontal field driving mode such as an IPS (in plane switching) mode and a FFS (fringe field switching) mode.

R, G, and B color filters 135 and a plurality of black matrixes 130 therebetween are formed on the color filter substrate 120. The color filter 135 acts to convert light emitted from a backlight unit and transmitted through the liquid crystal layer 150 to have red, green, and blue colors. In addition, the black matrixes 130 are positioned between the color filters 135 to distinguish a left eye image and a right eye image.

In addition, an alignment film (not shown) setting a pretilt angle of liquid crystal in an internal surface coming into contact with the liquid crystal layer 150 is formed, and a column spacer (not shown) maintaining a cell gap of the liquid crystal cell is positioned between the thin film transistor array substrate 110 and the color filter substrate 120.

A black stripe 160, an antistatic film 170 including a lower coating layer 172 and an upper coating layer 174 on the black stripe 160, and a patterned retarder film 195 are positioned on an external surface of the color filter substrate 120. The black stripe 160 is positioned to correspond to the black matrix 130, thus contributing to improvement of a viewing angle of a stereoscopic image.

The antistatic film 170 is constituted by the lower coating layer 172 and the upper coating layer 174 to discharge static electricity occurring on the color filter substrate 120 to the outside. The antistatic film 170 is formed on an entire surface of the color filter substrate 120. A more detailed description of the antistatic film 170 will be given below.

The patterned retarder film 195 is positioned on the antistatic film 170. In the patterned retarder film 195, a first retarder pattern 180a and a second retarder pattern 180b are formed on a passivation film 190. The first retarder pattern 180a is disposed to face a line in which the left eye image is displayed in the display panel DP, thus converting light of the left eye image into first polarized light (circularly polarized light or linearly polarized light). The second retarder pattern 180b is disposed to face a line in which the right eye image is displayed in the display panel DP, thus converting light of the right eye image into second polarized light (circularly polarized light or linearly polarized light). For example, the first retarder pattern 180a may be embodied as a polarizing filter through which left-circularly polarized light is transmitted. The second retarder pattern 180b may be embodied as a polarizing filter through which right-circularly polarized light is transmitted.

For the stereoscopic display device having the aforementioned constitution, a user sees only the left eye image through a left eye and only the right eye image through a right eye through polarizing eyeglasses provided with a polarizing film through which only a first polarization component is transmitted to the left eye and a polarizing film through which only a second polarization component is transmitted to the right eye. Accordingly, the user feels the image displayed on the display panel DP as a stereoscopic image.

Hereinafter, the antistatic film will be described in detail.

The antistatic film of the disclosure is constituted, for example, to protect the black stripe patterned on one surface of the substrate of the display device and prevent an occurrence of static electricity of the substrate. The antistatic film has a double-layered structure of the lower coating layer and the upper coating layer.

The upper coating layer includes a conductive material, tetraethyl orthosilicate, a solvent, and an additive.

The conductive material constituting the upper coating layer of the disclosure is particularly constituted to prevent static electricity on the substrate of the display device. For example, the conductive material may be selected from the group consisting of a conductive polymer, metal oxide, a carbon nanotube (CNT), graphene, and a combination thereof. Further, the conductive materials are constituted to secure transmittance of the substrate and hardness of the coating layer.

The conductive polymer is an organic polymer having lightness in weight, easiness of processability, and electrification as intrinsic properties of the polymer, and has a conjugated bond where a single bond and a double bond are alternately formed. The conductive polymer according to the disclosure includes a conductive polymer doped with another appropriate material as well as a pure conductive polymer.

Examples of the conductive polymer include a conductive polymer not including a hetero atom, such as polyfluorene, polyphenylene, polypyrene, polyazulene, polynaphthalene, polyacetylene (PAC), and poly(p-phenylene vinylene) (PPV); a conductive polymer including nitrogen (N) as the hetero atom, such as polypyrrole (PPY), polycarbazole, polyindole, polyazepine, poly(thienylene vinylene), and polyaniline (PANI); a conductive polymer including sulfur (S) as the hetero atom, such as poly(thiophene) (PT), poly (p-phenylene sulfide) (PPS), and poly(3,4-ethylenedioxy thiophene) (PEDOT); a conductive polymer including oxygen (O) as the hetero atom, such as polyfuran, and a conductive material in which the conductive polymers are doped with other materials. The conductive polymers may have a form substituted by an appropriate substituent group, for example, an aromatic cycle as well as an aliphatic group such as an alkyl group and an alkoxy group.

Preferably, the conductive polymer doped with another material to improve dispersibility to the solvent or conductivity, or a material substituted with an appropriate functional group may be used as the conductive polymer. For example, halogen gas such as $I_2$ and $Br_2$, alkali metal such as Li and Na, and $AsF_6$ may be used as a dopant in polyacetylene as the conductive polymer. Further, $BF_4^-$ and $ClO_4^-$ may be used as the dopant of polypyrrole, polythiophene, polyazulene, and polyfuran. $AsF_6$ may be used as the dopant of polyphenylene sulfide, polyphenylenevinylene, polythienylenevinylene, and polyphenylene in addition to polyacetylene. Meanwhile, hydrochloric acid (HCl), dodecyl benzene sulfonic acid (DBSA), and camphorsulfonic acid (CSA) may be used as the dopant of polyaniline. In the case of polypyrrole, a tosyl group such as p-methylphenyl sulfonate in addition to $BF_4^-$ and $ClO_4^-$ may be used as the dopant. In the case of polythiophene, the tosyl group such as p-methylphenyl sulfonate and $FeCl_4$ may be used as the dopant. In the case of polyphenylene, alkali metal such as Li and K in addition to $AsF_6$ may be used as the dopant.

With respect to the conductive material constituting the upper coating layer of the disclosure, the conductive polymer is particularly preferably a conductive polymer having PEDOT as a main component. Examples thereof include unsubstituted PEDOT, poly(3,4-ethylenedioxy thiophene (PEDOT:PSS) doped with poly(styrene sulfonate), or poly (3,4-ethylenedioxy thiophene)-tetramethacrylate (PEDOT-TMA).

The sulfonic acid group of PSS in PEDOT:PSS is deprotonated in the solvent to have a negative electric charge, and may act as a dispersing element. Meanwhile, PEDOT is a n conjugated system conductive polymer and a PEDOT portion has a positive electric charge. Accordingly, PEDOT may have favorable dispersibility to particularly a hydrophilic solvent to form a stable salt form. When EDOT as a monomer of PEDOT is added to an appropriate solvent such as water in the presence of PSS, an acid water-dispersible solution is formed. Accordingly, the PEDOT:PSS solution may cause oxygen polymerization to form a stable dispersing element. PEDOT-TMA as another conductive polymer has excellent dispersibility to an organic solvent and is not corroded. Accordingly, PEDOT-TMA may be used instead of PEDOT:PSS.

Meanwhile, as the conductive material constituting the upper coating layer according to the disclosure, a carbonaceous conductive material such as the carbon nanotube and/or graphene in addition to the aforementioned conductive polymer may be used. Herein, the carbon nanotube (CNT) may be a single-walled carbon nanotube (SWNT), a double-walled carbon nanotube (DWNT), or a multi-walled carbon nanotube (MWNT). In the carbon nanotube, physical and chemical agglomeration is formed between nanotube particles during a synthesis step. Therefore, appropriate treatment may be performed to disperse the carbon nanotube in the solvent in a coating composition according to the disclosure.

For example, 1) a method for adding a carbon nanotube to an organic solvent such as 1,2-dichlorobenzene, N-methylpyrrolidone (NMP), and N,N-dimethylformamide (DMF), which are known to well disperse the carbon nanotube, and then performing ultrasonication, 2) a method for using an ionic low molecular surfactant such as sodium dodecyl sulfate (SDS), Trixon X-100, sodium dodecyl benzene sulfonate (NaDDBS), and an Arabic gum and/or a polymer type surfactant such as a 2-membered or 3-membered copolymer such as polyvinylpyrrolidone (PVP), 3) a method for introducing a carboxyl group through acid treatment, increasing solubility to water and alcohol, and selectively substituting the carboxyl group by hydrocarbons such as aniline octadecylamine (ODA) and tetradecylaniline to induce dispersion to an aromatic organic solvent, 4) a method for using an ionic liquid, which is used as an electrolyte, for example, 1-butyl-3-methylimidazolium tetrafluoroborate (BMIMBF4) and 1-butyl-3-methylimidazolium hexafluorophosphate (BMIMPF6), and if necessary, re-dispersing the ionic liquid in an organic solvent, or 5) a method for using a pyrene derivative having a long-chained alkyl group (the number of carbon atoms is 10 to 20) on a surface of CNT to improve dispersibility of CNT may be used. Further, according to a recent study, an amine group of an organic molecule and carboxylic acid of a surface of the carbon nanotube subjected to acid treatment form zwitterions. Dispersibility to the solvent of the carbon nanotube may be improved by using the zwitterions.

Graphene usable as an example of the conductive material constituting the upper coating layer of the disclosure is one of a graphitic carbon material, and has dispersibility that is not favorable to some organic solvents such as NMP or DMF. However, dispersibility to the solvent may be improved by using the following method. First, there is a method for performing surface modification to provide a functional group to a surface of graphene through a covalent bond (covalent functionalization method of graphene). In this method, first, natural graphite is subjected to oxidation treatment by a strong acid to be dispersed/stripped as graphene oxide having oxygen functional groups such as an epoxy group, a hydroxyl group, a carbonyl group, and a carboxylic acid group at an edge region. Subsequently, a material reacting with the oxygen functional groups of GO is used or GO is reduced through heat treatment to manufacture reduced graphene oxide (rGO).

For example, the covalent bond may be formed through an amidation reaction and/or an esterification reaction with the oxygen functional groups present on the surface of GO. Specifically, an isocyanate organic unimolecule and GO may be covalent-bonded, or an organic unimolecule or a polymer having a compound having an amine group, a hydroxyl group, or an azide group or a diazonium compound may be covalent-bonded with graphene or a carboxylic acid present on the surface of GO to perform surface modification. For example, a method for reacting porphyrin having the amine group with the carboxyl group on the surface of GO to synthesize graphene having a surface modified to have an amide bond, bonding a material having a hydroxyl group such as polyvinyl acetate with the carboxylic acid of GO to modify graphene to have an ester bond on a surface thereof, or a reacting a material having an azide bond, such as perfluorophenyl azide (PFPA) unsubstituted or substituted by an alkyl group, with a C=C double bond portion of GO to synthesize graphene having a surface modified to have a nitrene group may be considered. Graphene subjected to surface modification by the aforementioned method may improve dispersibility to particularly DMF, NMP, and dimethyl sulfoxide (DMSO).

In addition to a method for introducing the aforementioned covalent functional group to modify the surface of graphene, a method for introducing a noncovalent functional group to graphene is known. In introduction of the noncovalent functional group, a π-π bond, a hydrogen bond, or an interaction between electric charges of graphene is used. For example, the carboxylic acid group present in a pyrene carboxylate derivative stably disperses graphene in an aqueous solution and maintains a physical adsorption state with a graphene sheet. The conductive polymer such as P3HT (poly(3-hexylthiphene)) is π-π bonded with rGO— to form a macromolecular complex, and well dispersed in the solvent such as DMF.

Alternatively, when an amphoteric material (for example, sodium cholate) or a surfactant is used, dispersibility of graphene to the aqueous solution may be improved. Particularly, according to a recent study, the carboxylic acid group of the positive electric charge present at the edge of GO and the amine group of the negative electric charge of a terminal of a polymer may electrostatically interact with each other to adsorb the polymer to the edge of GO, thereby uniformly dispersing graphene in the organic solvent such as benzene, o-xylene, and methylene chloride.

As the metal oxide usable as an example of the conductive material constituting the upper coating layer of the disclosure, any metal oxide is capable of being used as long as the metal oxide is capable of being used as a solute such as zinc oxide (ZnO).

With respective to the upper coating layer composition forming the upper coating layer of the disclosure, the conductive material, which may be selected from the group consisting of the conductive polymer, the metal oxide, the carbon nanotube, graphene, and a combination thereof, may be included in a content of 0.1 to 10 parts by weight and preferably 0.1 to 5 parts by weight based on the upper coating layer composition. This is because when the content of the conductive material is less than the aforementioned range, desired conductivity is not secured, and thus the conductive material is not suitable to prevent static electricity of the substrate on which the composition may be applied, and when the content of the conductive material is more than the aforementioned range, transmittance may be reduced.

Meanwhile, tetraethyl orthosilicate (TEOS) constituting the upper coating layer of the disclosure has the following Structural Formula.

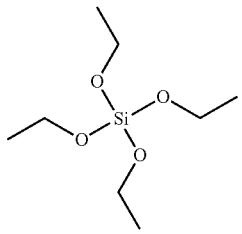

Tetraethyl orthosilicate may form cross-linking by a curing process such as heat treatment as will be described below to form polysiloxane, thereby becoming a binder resin forming the matrix. Tetraethyl orthosilicate may improve all of hardness, transmittance, and reliability of the upper coating layer.

With respect to the upper coating layer composition forming the upper coating layer of the disclosure, tetraethyl orthosilicate may be included in a content of 5 to 30 parts by weight based on the upper coating layer composition. When the content of tetraethyl orthosilicate is 5 parts by weight or more, the content of solids is excessively increased, and thus a reduction in stability of the coating composition may be prevented. When the content of tetraethyl orthosilicate is 30 parts by weight or less, hardness and transmittance of the manufactured coating layer may be secured.

The solvent constituting the upper coating layer composition forming the upper coating layer of the disclosure is used for the purpose of dispersing solid components such as the conductive material and tetraethyl orthosilicate and adjusting viscosity of the coating composition. Moreover, the solvent may improve conductivity of the conductive material. Preferably, when a solvent having a high boiling point is used, a cross-linkable compound may be more stably cross-linked.

For example, when the conductive polymer is a hydrophilic polymer, a hydrophilic solvent may be used as the solvent dispersing the conductive material and tetraethyl orthosilicate. As specific examples of the usable hydrophilic solvent, an organic solvent selected from water; alcohols such as ethanol, methanol, isopropyl alcohol, butanol, 2-ethylhexyl alcohol, methoxypentanol, butoxyethanol, ethoxyethoxyethanol, butoxyethoxyethanol, methoxypropoxypropanol, texanol, and terpineol such as α-terpineol; tetrahydrofuran (THF); glycerol, alkylene glycol, for example, ethylene glycol, triethylene glycol, polyethylene glycol, propylene glycol, dipropylene glycol, dihexylene glycol, or alkyl ether thereof (for example, propylene glycol methyl ether (PGME), diethylene glycol butyl ether, diethylene glycol ethyl ether, dipropylene glycol methyl ether, and dihexylene glycol ethyl ether); glycerin, N-methylpyrrolidinone (N-methyl-2-pyrrolidinone, NMP), 2-pyrrolidinone, acetylacetone, 1,3-dimethylimidazolinone, thiodiglycol, dimethyl sulfoxide (DMSO), N,N-dimethyl acetamide (DMAc), dimethylformamide (DMF), sulfolane, diethanolamine, and triethanolamine may be used alone, or by mixture of two types or more thereof. For example, when PEDOT:PSS is used as the conductive polymer, if the hydrophilic solvent having high polarity is used alone or by mixture, PEDOT:PSS may act as an expansion agent well dispersing the conductive polymer.

In this case, for example, when water is used as the solvent to disperse the carbon nanotube as the conductive material, a (NH$_2$OH)(HCl) component may be included in the aqueous solution. (NH$_2$OH)(HCl) is dissociated into NH$_3$OH$^+$ and Cl$^-$ on an aqueous solution phase to have acidity. NH$_3$OH$^+$ as a cation is an ion having acidity, and is diffused between the carbon nanotubes and permeates thereinto to charge surfaces of carbon nanotube particles with cations. The carbon nanotube may be dispersed in the solvent due to electrostatic repulsive force caused by the charged carbon nanotube particles.

Meanwhile, when the conductive polymer having hydrophobicity is used, a hydrophobic solvent may be used. For example, ketones such as methyl ethyl ketone and cyclopentanone, aromatic compounds such as xylene, toluene, or benzene, ethers such as dipropylene methyl ether, and aliphatic hydrocarbons such as methylene chloride and chloroform may be used alone or by mixture of two types or more thereof.

The solvent may be included in a content of 30 to 60 parts by weight in the upper coating layer composition according to the disclosure. When the solvent is used in the aforementioned range, viscosity of the composition may be appropriately maintained, and the conductive material and/or tetraethyl orthosilicate may be uniformly dispersed.

Meanwhile, the upper coating layer composition of the disclosure may further include a functional additive, such as an antioxidant, which prevents oxidation of the composition or increases solubility, in addition to the aforementioned components.

Specific examples of the antioxidant used for the purpose of preventing an oxidation reaction of the composition induced by heat and providing thermal stability may include one type or more selected from tetrakis-(methylene-(3,5-di-t-butyl-4-hydro cinnamate)methane, 3,5-bis(1,1-dimethylethyl)-4-hydroxy benzenepropanoic acid thiol di-2,1-ethanediyl ester, octadecyl 3,5-di-t-butyl-4-hydroxy hydrocinnamate, 2,6-di-tertiary-p-methylphenol, 2,2-thiobis (4-methyl-6-t-butylphenol), 2,6-g,t-butylphenol, and N-methylpyrrolidone (NMP). However, the disclosure is not necessarily limited to the aforementioned antioxidants. Further, a functional additive such as an acetic acid or a hydrochloric acid (HCl) may be further included as an acid value adjusting agent helping dissolution of tetraethyl orthosilicate and adjusting an acid value (pH).

The content of the additive may depend on the type and the content of the conductive material and the solvent included in the composition. However, the additive may be included in the content of about 8 to 16 parts by weight in the upper coating layer composition. Accordingly, the upper coating layer composition constituting the upper coating layer of the disclosure may include 0.1 to 10 parts by weight of the conductive material, 5 to 30 parts by weight of tetraethyl orthosilicate, 30 to 60 parts by weight of the solvent, and 8 to 16 parts by weight of the additive.

Meanwhile, the lower coating layer composition forming the lower coating layer constituting the antistatic film of the disclosure includes the conductive material, tetraethyl orthosilicate, silsesquioxane (SSQ), the solvent, and the additive. The constitution of the lower coating layer is the same as the constitution of the upper coating layer, except that silsesquioxane is further included and the content of the each constitution is different from that of the upper coating layer.

The conductive material constituting the lower coating layer of the disclosure is the same as that of the upper coating layer, and may be included in a content of 20 to 25 parts by weight based on the lower coating layer composition. This is because when the content of the conductive material is less than the aforementioned range, desired conductivity is not secured, and thus the conductive material is not suitable to prevent static electricity of the substrate on which the composition may be applied, and when the content of the conductive material is more than the aforementioned range, transmittance may be reduced.

Further, tetraethyl orthosilicate constituting the lower coating layer of the disclosure is the same as that of the upper coating layer, and may be included in a content of 7 to 11 parts by weight based on the lower coating layer composition. Further, the solvent constituting the lower coating layer of the present invention is the same as that of the upper coating layer, and may be included in a content of 25 to 40 parts by weight based on the lower coating layer composition. Further, the additive constituting the lower coating layer of the disclosure is the same as that of the upper coating layer, and may be included in a content of 8 to 16 parts by weight based on the lower coating layer composition.

Meanwhile, silsesquioxane constituting the lower coating layer of the disclosure may be synthesized by a reaction of methyltrichlorosiloxane and dimethylchlorosiloxane. Silsesquioxane may be synthesized into polysilsesquioxane having a ladder structure or a cage structure like the following Structural Formula by the cross-linking. For example, heptamer type siloxane having a partial cage structure, and heptamer type siloxane and octamer type siloxane having the cage structure are obtained by hydrolysis of organotrichlorosilane. Heptamer type siloxane may be separated by using a difference in solubility, and be subjected to a condensation reaction with organotrialkoxysilane or organotrichlorosilane to obtain a silsesquioxane monomer. Silsesquioxane may have a chemical structure of approximately $RSiO_{3/2}$ (R is hydrogen; an alkyl group having 1 to 10 carbon atoms; an alkenyl group having 2 to 10 carbon atoms; an aryl group such as phenyl; or an arylene group), but silsesquioxane usable in the disclosure is not limited thereto.

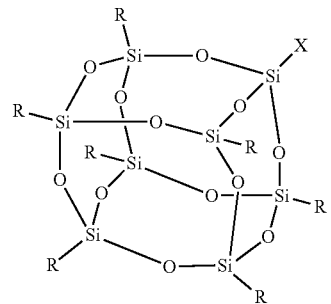

Silsesquioxane may improve viscosity, transmittance, and reliability of the lower coating layer. Particularly, when the upper coating layer composition contributes to improvement in hardness of the antistatic film, the lower coating layer composition further include silsesquioxane to contribute to formation of the lower coating layer having a large thickness.

With respect to the lower coating layer composition forming the lower coating layer of the disclosure, silsesquioxane may be included in a content of 20 to 30 parts by weight based on the lower coating layer composition. When the content of silsesquioxane is 20 parts by weight or more, the lower coating layer may be formed in a large thickness. When the content of silsesquioxane is 30 parts by weight or less, transmittance of a manufactured coating film may be secured.

Accordingly, the lower coating layer composition forming the lower coating layer of the disclosure includes 20 to 25 parts by weight of the conductive material, 7 to 11 parts by weight of tetraethyl orthosilicate, 20 to 30 parts by weight of silsesquioxane, 25 to 40 parts by weight of the solvent, and 8 to 16 parts by weight of the additive.

Hereinafter, a method for manufacturing the antistatic film of the disclosure will be described.

In the antistatic film of the disclosure, the lower coating layer composition is applied on the substrate, cross-linking of tetraethyl orthosilicate included in the applied lower coating layer composition is induced, and the solvent is removed by heat treatment to form the lower coating layer including the conductive material and tetraethyl orthosilicate. In addition, the upper coating layer composition is applied on the lower coating layer to induce cross-linking of tetraethyl orthosilicate and bonding with silsesquioxane, and the solvent is removed by heat treatment to form the upper coating layer including the conductive material, tetraethyl orthosilicate, and silsesquioxane.

For example, the lower and upper coating layer compositions of the disclosure may be applied on the substrate by using a method such as spin coating, roller coating, spray coating, bar coating, and slit coating. The thickness of the formed lower coating layer may vary if necessary. However, for example, it is preferable that the lower and upper coating layer compositions be thickly applied so as to sufficiently cover the black stripe shown in FIG. 2. In this case, in order to adjust the thickness of the lower coating layer, when the lower coating layer composition is manufactured, the lower coating layer may be formed in a desired thickness by adjusting the content of solids and viscosity. In addition, the upper coating layer is formed in a thickness that is smaller than that of the lower coating layer. Therefore, the upper coating layer acts to improve hardness of an upper surface of the antistatic film.

Accordingly, unlike the case where known back ITO is used, the antistatic film of the disclosure may be formed as a flat film over an entire region of the substrate. Therefore, a step in regions where the black stripe is formed and a substrate region therebetween may be removed.

Meanwhile, as described above, the lower and upper coating layer compositions according to the disclosure include tetraethyl orthosilicate. After tetraethyl orthosilicate is subjected to a sol-gel reaction and then hydrolyzed as shown in the following Reaction Equation, hydrolyzed tetraethyl orthosilicates may be cross-linked (2a), or tetraethyl orthosilicate and hydrolyzed tetraethyl orthosilicate may be cross-linked (2b) to form polysiloxane.

TABLE 1

Component content of the coating composition

| | | Component | | |
|---|---|---|---|---|
| | | Lower coating layer composition # | | Upper coating layer composition |
| | | Synthetic Example 1 | Synthetic Example 2 | Synthetic Example 3 |
| Conductive material | PEDOT:PSS | 20 | 25 | 0.6 |
| Silicon compound | TEOS | 10.5 | 10.5 | 15 |
| | SSQ | 20 | 20 | |
| Solvent | PGME, AcAc, water | 38.75 | 34 | 83.9 |
| Additive | NMP | 10 | 10 | |
| | Acetic acid | 0.5 | 0.5 | 0.5 |
| | Others | 0.25 | | |
| Sum | | 100 | 100 | 100 |

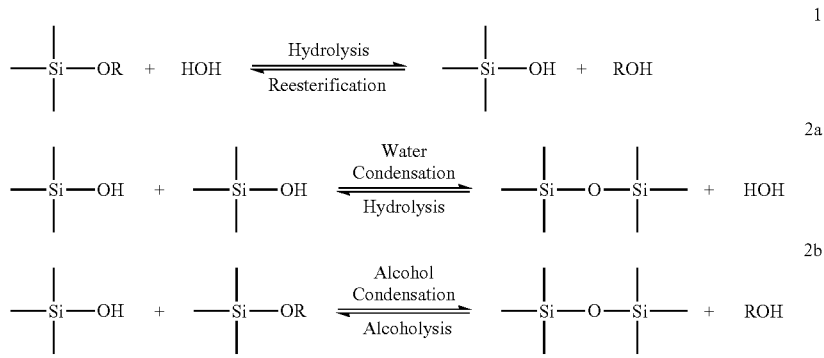

A heat treatment method may be used to remove the solvent included in the lower coating layer composition or the upper coating layer composition. Heat treatment may be performed at 140 to 230° C. for 10 to 20 min. As described above, the solvent may be completely evaporated to be removed, and only the conductive material and cross-linked polysiloxane as the solids may remain to form the antistatic film including the lower and upper coating layers.

Hereinafter, preferable Examples will be described in order to help understanding of the disclosure. However, the following Examples are set forth to illustrate but are not to be construed to limit the disclosure.

SYNTHETIC EXAMPLE

The conductive material, tetraethyl orthosilicate, the solvent, and the additive were mixed at the polymerization ratio described in the following Table 1 to manufacture the upper coating layer composition in the liquid phase. The conductive material, tetraethyl orthosilicate, silsesquioxane, the solvent, and the additive were mixed at the polymerization ratio described in the following Table 1 to manufacture the lower coating layer composition in the liquid phase.

Example 1: Manufacturing of the Antistatic Film 1

The lower coating layer composition manufactured according to Synthetic Example 1 was applied by spin coating on the 100×100 glass substrate in the different conditions of 600, 900, and 1200 rpm/15 sec, and heat-treated at 140° C. for about 10 min to form the lower coating layer. The upper coating layer composition manufactured according to Synthetic Example 3 was applied by spin coating on the lower coating layer in the condition of 1000 rpm/15 sec, and heat-treated at 180° C. for about 10 min to form the upper coating layer, thereby manufacturing the antistatic film.

Example 2: Manufacturing of the Antistatic Film 2

The lower coating layer composition manufactured according to Synthetic Example 2 was applied by spin coating on the 100×100 glass substrate in the different conditions of 600, 900, 1200, and 1500 rpm/15 sec, and heat-treated at 180° C. for about 10 min to form the lower coating layer. The upper coating layer composition manufactured according to Synthetic Example 3 was applied by spin coating on the lower coating layer in the condition of 1000 rpm/15 sec, and heat-treated at 140° C. for about 10 min to form the upper coating layer, thereby manufacturing the antistatic film.

Example 3: Manufacturing of the Antistatic Film 3

The lower coating layer composition manufactured according to Synthetic Example 2 was applied on the 100×100 glass substrate in the different slit coating conditions described in the following Table 2, and heat-treated at 180° C. for about 10 min to form the lower coating layer. The upper coating layer composition manufactured according to Synthetic Example 3 was applied in a thickness of 300 nm by slit coating on the lower coating layer, and heat-treated at 180° C. for about 10 min to form the upper coating layer, thereby manufacturing the antistatic film.

TABLE 2

| | | Condition of slit coating | | | |
|---|---|---|---|---|---|
| # | Thickness | Coating speed (mm/s) | Coating gap (μm) | Coating length (mm) | Pumping ratio (μl/s) | Total pumping amount (μl) |
| 1 | 1.5 | 30 | 150 | 460 | 190 | 2850 |
| 2 | 2 | 30 | 150 | 460 | 250 | 3800 |
| 3 | 3 | 30 | 150 | 460 | 380 | 5700 |
| 4 | 4 | 30 | 150 | 460 | 500 | 7580 |

Example 4: Manufacturing of the Antistatic Film 4

The lower coating layer composition manufactured according to Synthetic Example 1 was applied by slit coating on the 100×100 glass substrate, and heat-treated at 140° C. for about 10 min to manufacture the lower coating layer.

Example 5: Manufacturing of the Antistatic Film 5

The black matrix (BM) having a thickness of 1 μm was formed on the 100×100 glass substrate, and the lower coating layer was formed in the same condition as Example 4. The upper coating layer composition manufactured according to Synthetic Example 3 was applied by spin coating on the lower coating layer, and heat-treated at 180° C. for about 10 min to form the upper coating layer, thereby manufacturing the antistatic film.

Example 6: Manufacturing of the Stereoscopic Display Device 1

The stereoscopic display device including the lower and upper coating layers manufactured in Example 5 was manufactured. The black stripe having a thickness of 1.2 μm was formed on the upper surface of the glass color filter substrate. The antistatic film of the lower and upper coating layers according to Example 5 was formed in a thickness of 1.3 μm on the upper surface of the color filter substrate. The black matrix, the color filter, and the common electrode were formed on the lower surface of the color filter substrate. In addition, the thin film transistor and the pixel electrode were formed on the thin film transistor array substrate. The color filter substrate and the thin film transistor substrate were sealed, and the liquid crystal was injected to manufacture the liquid crystal cell. The manufactured liquid crystal cell was transported to the washing module, subjected to the washing process such as polishing belt washing (3M aluminum oxide), surface washing using the brush, and shower washing using pure water, and then dried. Polarizers were attached to the upper portion of the color filter substrate and the lower portion of the thin film transistor array substrate to manufacture the stereoscopic display device.

Example 7: Manufacturing of the Stereoscopic Display Device 2

The stereoscopic display device was manufactured in the same process condition as Example 6, except that the black stripe having a thickness of 1.3 μm was formed and the antistatic film having a thickness of 1.7 μm was formed.

Comparative Example: Manufacturing of the Stereoscopic Display Device Using the Overcoat Layer The stereoscopic display device was manufactured in the same process condition as Example 6, except that the overcoat layer was formed instead of the antistatic film of the disclosure.

Experimental Example 1: Measurement of Mechanical, Electrical, and Optical Properties of the Antistatic Film by Spin Coating Sheet resistance, transmittance, the haze, reflectance, the color coordinate, and pencil hardness of the antistatic films manufactured according to Examples 1 and 2 were measured, and are described in the following Table 2.

TABLE 3

| Measurement result of the property of the antistatic film | | | | | | | |
|---|---|---|---|---|---|---|---|
| | | Sheet Resistance (log | Transmitt- | Haze | Reflect- ance | Color Coordinate | | Pencil Hard- |
| | Rpm | scale) | ance (%) | (%) | (%) | a* | b* | ness |
| Example 1 | 600 | 4.4 | 96.9 | 0.49 | 7.74 | −0.23 | −0.87 | 9H |
| | 900 | 4.6 | 97.9 | 0.37 | 7.68 | −0.01 | −0.67 | 9H |
| | 1200 | 4.8 | 98.6 | 0.28 | 8.02 | −0.13 | −0.86 | 9H |
| Example 2 | 600 | 4.5 | 96.8 | 0.29 | 7.68 | −0.2 | −0.82 | 9H |
| | 900 | 4.7 | 97.9 | 0.26 | 7.77 | −0.27 | −0.69 | 9H |
| | 1200 | 4.9 | 98.4 | 0.24 | 7.91 | −0.51 | −0.70 | 9H |
| | 1500 | 5.1 | 98.9 | 0.21 | 7.78 | −0.31 | −0.59 | 9H |

Referring to Table 3, it can be seen that even though the component content of the lower coating layer is changed and the spin coating condition is changed into 600, 900, 1200, and 1500, transmittance is about 96% or more, the haze is about 0.5% or less, reflectance is about 8% or less, and the almost transparent color coordinate is obtained, and thus the optical property is similar to that of the glass substrate. Further, it can be seen that pencil hardness is 9H or more and sheet resistance is 5.1 or less.

Experimental Example 2: Measurement of Mechanical, Electrical, and Optical Properties of the Antistatic Film by Slit Coating The coating property, pencil hardness, the haze, transmittance, reflectance, and the color coordinate of the antistatic film manufactured according to Example 3 were measured, and are described in the following Table 4.

TABLE 4

Measurement result of the property of the antistatic film

| # | Coating property | Pencil hardness | Haze (%) | Transmittance (%) | Reflectance (%) | Color coordinate a* | b* |
|---|---|---|---|---|---|---|---|
| 1 | OK | 8H | 0.79 | 96.8 | 7.68 | −0.02 | −0.81 |
| 2 | OK | 8H | 0.64 | 95.7 | 7.63 | −0.07 | −0.74 |
| 3 | OK | 9H | 0.68 | 92.8 | 7.56 | −0.21 | −0.81 |
| 4 | OK | 9H | 0.94 | 90.6 | 7.43 | −0.22 | −0.84 |

Referring to Table 4, it can be seen that pencil hardness, the haze, transmittance, reflectance, and the color coordinate have the same level as the properties of the antistatic film formed by the spin coating.

Figure 3A:
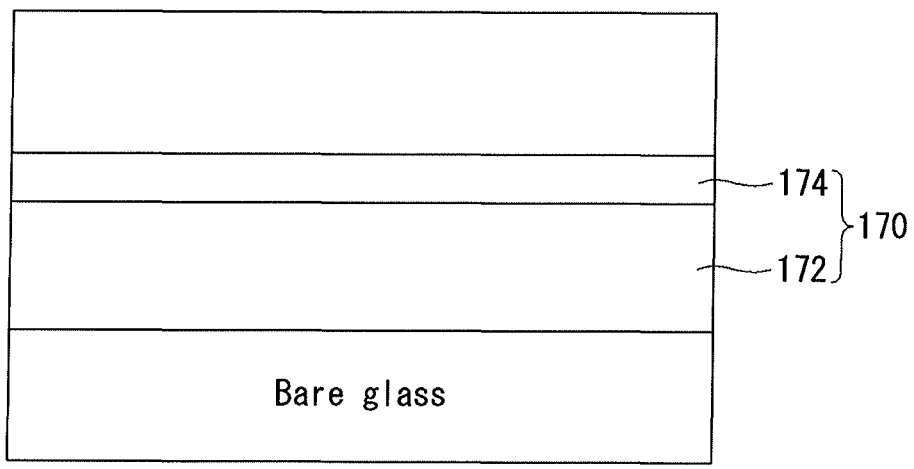
FIGS. 3a and 3b are views showing an antistatic film manufactured according to Example 5 of the disclosure.
Figure 3B:
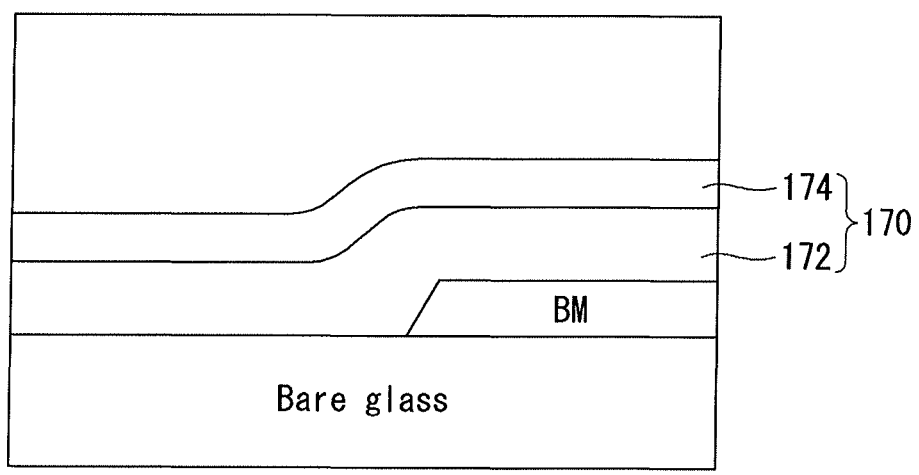

Experimental Example 3: Measurement of Mechanical, Electrical, and Optical Properties According to the Structure of the Antistatic Film The coating property, the thickness, pencil hardness, sheet resistance, transmittance, the haze, reflectance, and the color coordinate of the antistatic films manufactured according to Examples 4 and 5 were measured, and are described in the following Table 5, and transmittance, the haze, reflectance, and the color coordinate of the bare glass substrate are also described therein. Further, views showing the antistatic film manufactured according to Example 5 are shown in FIGS. 3a and 3b.

TABLE 5

Measurement result of the property of the antistatic film

| | Coating property | Thickness (μm) | Pencil hardness | Sheet resistance | Transmittance (%) | Haze (%) | Reflectance (%) | Color coordinate a* | b* |
|---|---|---|---|---|---|---|---|---|---|
| Bare glass | | | | | 100 | 0.18 | 8.27 | 0.04 | −0.57 |
| Example 4 | OK | 1.33 | 6H | 4.5 | 96.8 | 0.29 | 7.68 | −0.2 | −0.82 |
| Example 5 | OK | 2.79 | 9H | 4.7 | 97.9 | 0.26 | 7.77 | 0.27 | −0.69 |

Referring to Table 5, it can be seen that pencil hardness, transmittance, haze, and color coordinate properties of Example 5 having the two-layered structure of the lower and upper coating layers are better than those of Example 4 having the single layer of the lower coating layer.

Further, referring to FIGS. 3a and 3b, it was confirmed that the coating property of the antistatic film having the two-layered structure was favorable and the step of the structure such as the black matrix was covered.

Experimental Example 4: Scratch Examination of the Color Filter Substrate

Scratches of the color filter substrate of the stereoscopic display device manufactured according to Examples 6 and 7 and the Comparative Example were examined. Results of the scratch examination of the color filter substrate are shown in FIGS. 4 to 7.

Figure 4:
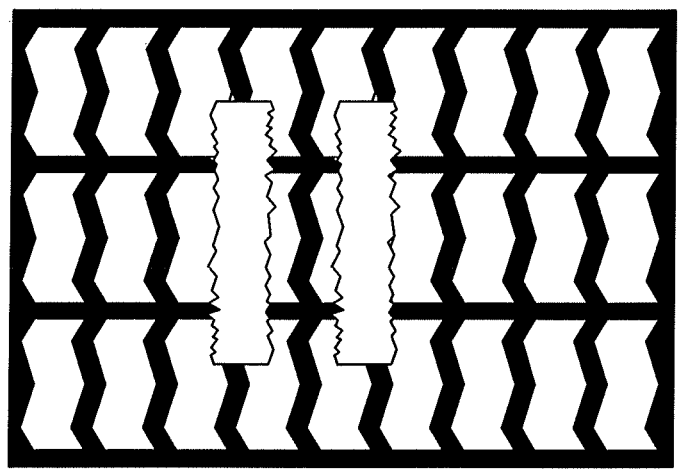
FIG. 4 is a view showing scratches of a color filter substrate manufactured according to a Comparative Example of the disclosure.
Figure 4:
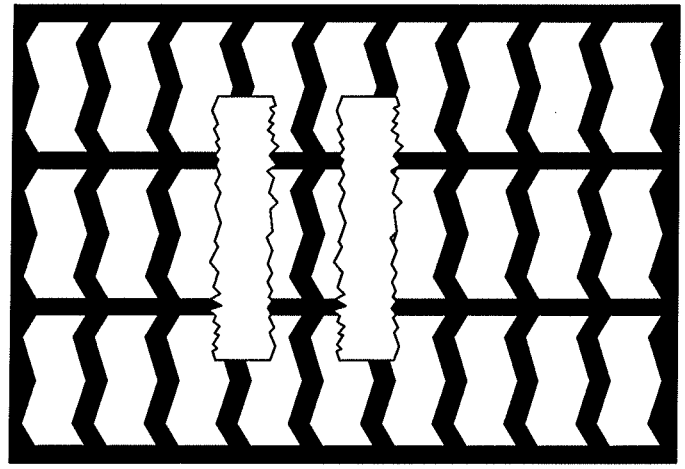

FIG. 4 is a view showing the scratches of the color filter substrate where the overcoat layer is formed on the black stripe according to the Comparative Example. As shown in FIG. 4, it was confirmed that the vertical scratches were formed.

Figure 5:
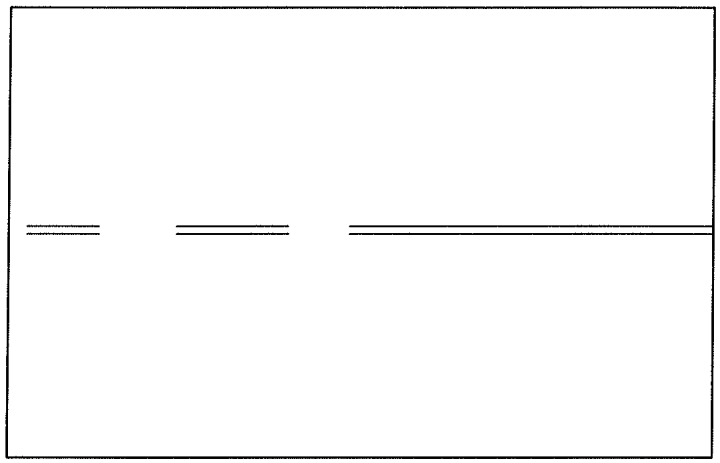
FIG. 5 is a view showing scratches of a color filter substrate manufactured according to Example 6 of the disclosure.

FIG. 5 is a view showing the scratches of the color filter substrate manufactured according to Example 6.

Figure 6:
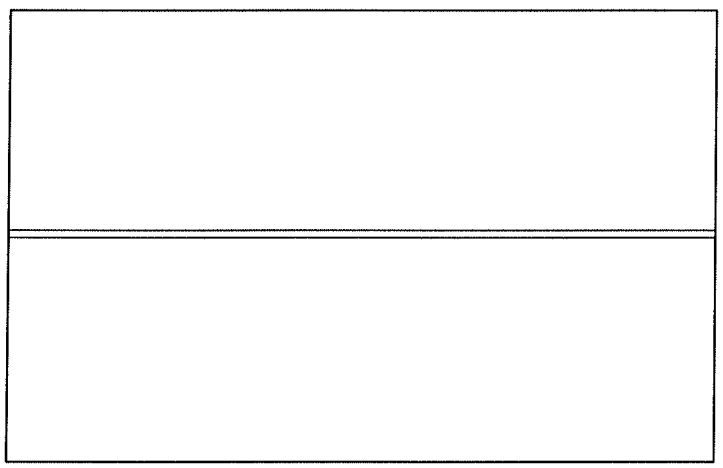
FIG. 6 is a view showing scratches of a color filter substrate manufactured according to Example 7 of the disclosure.

FIG. 6 is a view showing the scratches of the color filter substrate manufactured according to Example 7. As shown in FIGS. 5 and 6, it was confirmed that the small scratches not recognized by the eye were formed only at the outermost black stripe portion of the color filter substrate.

Figure 7:
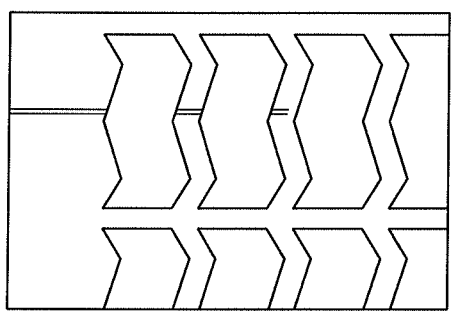
FIG. 7 is a view showing scratches of a color filter substrate manufactured according to Example 7 of the disclosure.
Figure 7:
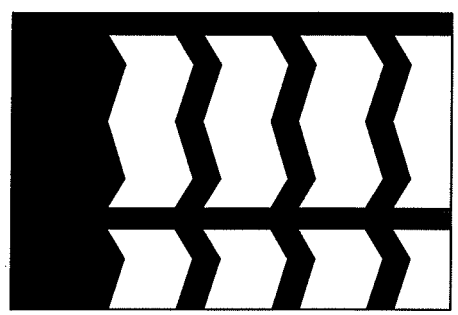
Figure 7:
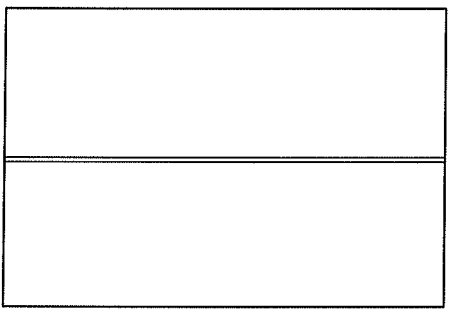
Figure 7:
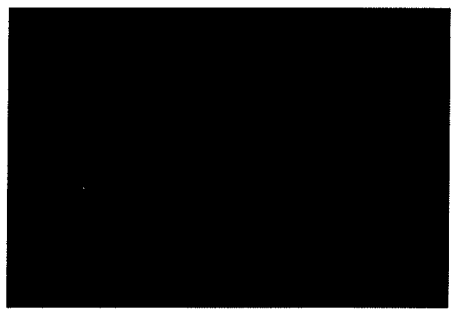

Further, FIG. 7 is a view showing the scratches of the color filter substrate manufactured according to Example 7 of the disclosure. As shown in FIG. 7, when the antistatic film of the disclosure is used, it can be seen that the small scratches not recognized by the eye are formed only at the outermost black stripe portion.

The antistatic film according to the exemplary embodiment of the disclosure, the method for manufacturing the same, and the display device including the same have advantages in that the antistatic film completely covering the step of the black stripe is manufactured and static electricity occurring on the substrate is prevented. Further, there is an advantage in that manufacturing yield and productivity are improved by improving hardness of the antistatic film to reduce the scratches formed during the washing process.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An antistatic film comprising:
    a substrate;
    a lower coating layer positioned on the substrate and consisting of a conductive material, tetraethyl orthosilicate (TEOS), and silsesquioxane (SSQ); and
    an upper coating layer positioned on the lower coating layer and consisting of the conductive material and tetraethyl orthosilicate,
    wherein the conductive material in the lower coating layer as the conductive material in the upper coating layer are a same material and the conductive material in the lower coating layer has a higher parts by weight than that in the upper coating layer, based on 100 parts by weight of the lower and the upper coating layer on the substrate, respectively.

2. The antistatic film of claim 1, wherein the conductive material is any one selected from the group consisting of a carbon nanotube (CNT), metal oxide, graphene, and a conductive polymer.

3. The antistatic film of claim 2, wherein the conductive polymer is one or more selected from the group consisting of polyfluorene, polyphenylene, polypyrene, polyazulene, polynaphthalene, polyacetylene (PAC), poly(p-phenylene vinylene) (PPV), polypyrrole (PPY), polycarbazole, polyindole, polyazepine, poly(thienylene vinylene), polyaniline (PANI), poly(thiophene), poly(p-phenylene sulfide) (PPS), poly(3,4-ethylenedioxy thiophene) (PEDOT), poly(3,4-ethylenedioxy thiophene) doped with poly(styrene sulfonate) (PSS) (PEDOT:PSS), poly(3,4-ethylenedioxy thiophene)-tetramethacrylate (PEDOT-TMA), polyfuran, and a combination thereof.

4. The antistatic film of claim 1, wherein a thickness of the lower coating layer is larger than the thickness of the upper coating layer.

5. The antistatic film of claim 1, wherein the lower coating layer contacts the upper coating layer.

6. The antistatic film of claim 1, wherein the upper and lower coating layers include same constituent materials except that the lower coating layer further includes silsesquioxane and except that the constituent materials in the upper and lower coating layers have different parts by weight.

7. A method for manufacturing an antistatic film, comprising:
preparing a substrate;
applying a lower coating layer composition consisting of 20 to 25 parts by weight of a conductive material, 7 to 11 parts by weight of tetraethyl orthosilicate, 20 to 30 parts by weight of silsesquioxane, 25 to 40 parts by weight of a solvent, and 8 to 16 parts by weight of an additive based on 100 parts by weight of the lower coating layer composition on the substrate, and heat-treating the lower coating layer composition to form a lower coating layer; and
applying an upper coating layer composition consisting of 0.1 to 10 parts by weight of the conductive material, 5 to 30 parts by weight of tetraethyl orthosilicate, 30 to 60 parts by weight of the solvent, and 8 to 16 parts by weight of the additive based on 100 parts by weight of the upper coating layer composition on the lower coating layer, and heat-treating the upper coating layer composition to form an upper coating layer,
wherein the conductive material in the lower coating layer is the same as the conductive material in the upper coating layer and the conductive material in the lower coating layer has a higher parts by weight than that in the upper coating layer.

8. The method of claim 7, wherein the conductive material is any one selected from the group consisting of a carbon nanotube (CNT), metal oxide, graphene, and a conductive polymer.

9. The method of claim 7, wherein the conductive material is one or more selected from the group consisting of polyfluorene, polyphenylene, polypyrene, polyazulene, polynaphthalene, polyacetylene (PAC), poly(p-phenylene vinylene) (PPV), polypyrrole (PPY), polycarbazole, polyindole, polyazepine, poly(thienylene vinylene), polyaniline (PANI), poly(thiophene), poly(p-phenylene sulfide) (PPS), poly(3,4-ethylenedioxy thiophene) (PEDOT), poly(3,4-ethylenedioxy thiophene) doped with poly(styrene sulfonate) (PSS) (PEDOT:PSS), poly(3,4-ethylenedioxy thiophene)-tetramethacrylate (PEDOT-TMA), polyfuran, and a combination thereof.

10. The method of claim 7, wherein the heat-treating is performed a 140 to 230° C. for 10 to 20 minutes.

11. The method of claim 7, wherein the lower coating layer composition or the upper coating layer composition is applied by slit coating or spin coating.

12. A stereoscopic display device comprising:
a thin film transistor array substrate;
a color filter substrate facing the thin film transistor array substrate and including a black matrix;
a black stripe on the color filter substrate and corresponding to the black matrix; and
an antistatic film on the black stripe,
wherein the antistatic film includes:
a lower coating layer consisting of a conductive material, tetraethyl orthosilicate (TEOS), and silsesquioxane (SSQ); and
an upper coating layer positioned on the lower coating layer and consisting of the conductive material and tetraethyl orthosilicate,
wherein the conductive material in the lower coating layer is the same as the conductive material in the upper coating layer and the conductive material in the lower coating layer has a higher parts by weight than that in the upper coating layer.

* * * * *